# United States Patent [19]
Wright

[11] 3,764,096
[45] Oct. 9, 1973

[54] THRUST REVERSING APPARATUS
[75] Inventor: Wallace Wright, San Diego, Calif.
[73] Assignee: Rohr Industries, Inc., Chula Vista, Calif.
[22] Filed: Feb. 24, 1972
[21] Appl. No.: 229,046

[52] U.S. Cl. .......... 244/110 B, 244/53, 239/265.29, 60/229
[51] Int. Cl. ............................................. B64d 29/00
[58] Field of Search .............. 244/12 D, 23 D, 53 R, 244/110 B; 239/265.29; 60/229

[56] References Cited
UNITED STATES PATENTS
| | | | |
|---|---|---|---|
| 3,483,702 | 12/1969 | Ward | 239/265.29 |
| 3,475,913 | 11/1969 | Mortlock | 239/265.29 |
| 3,612,401 | 10/1971 | Ellis et al. | 239/265.29 |

*Primary Examiner*—George E. A. Halvosa
*Assistant Examiner*—S. D. Basinger
*Attorney*—George E. Pearson

[57] ABSTRACT

Jet engine includes elongate streamlined shroud and a central body located substantially coaxially within at least the aft portion of the shroud to define between them a generally annular duct for rearward flow of a propulsion gas stream. The shroud may be the casing surrounding the engine, and the central body may be the "bullet" or center body aft of the turbine to define the profile of the discharge throat. In a fan type engine, the central body is the casing for the engine itself and the shroud is radially spaced from the casing to form a fan air duct. The reverser includes peripherally arranged outflow passage means extending through shroud wall forward of its trailing edge. A plurality of sets of control doors are peripherally arranged in the passage means and each set includes a blocker door and a deflector door. In preferred form, each blocker door is pivoted forward of its aft end to the shroud to swing in and contact central body, and each deflector door is pivoted at its aft end to the aft end of the blocker door to be bodily displaced and to swing outwardly. An operating lever is pivotally connected at its forward end to the shroud and at its aft end to a point intermediate the forward and aft end of the deflector door to complete a four bar linkage in which the doors themselves serve as two of the links. The operating lever is formed as a bell crank which is actuated by a servo motor.

5 Claims, 4 Drawing Figures

Patented Oct. 9, 1973

THRUST REVERSING APPARATUS

BACKGROUND OF THE INVENTION

This invention lies in the field of gas turbine engines, commonly called jet engines, which produce reaction thrust by rearward ejection of a high velocity gas stream. In a conventional jet engine, the gas stream consists entirely of the exhaust from the turbine exhaust but a large proportion is air driven rearward by an enlarged axial flow compressor through an annular duct between the engine casing and a surrounding shroud.

Airplanes equipped with jet type engines develop very high air speeds and have correspondingly high landing speeds which place a heavy burden on the wheel brakes. To reduce this burden, most such airplanes are provided with means to reverse the direction of flow of the jet stream during landing runs to produce a reverse thrust. Many different types of thrust reversers have been developed and used for this purpose. All of them utilize a basic principle of blocking rearward flow of the jet stream and diverting it laterally and forwardly. One type uses blocker doors swung directly behind the exhaust jet nozzle and diverging forwardly. Another type uses openings in the side walls of the nozzle or a surrounding fan air shroud together with blocker doors which swing toward the engine axis to block rearward flow and extend outward to direct the diverted flow laterally and forwardly. Still another type utilizes cascade sets in the side walls of the nozzle or shroud with various means to block rearward flow and uncover the cascades. All of these have various merits and have been used successfully. Their principal problems have been cost, weight, and complexity with resultant high maintenance expense.

SUMMARY OF THE INVENTION

The present invention obtains the benefits mentioned above while providing an apparatus which adds very little weight or complexity, with relatively few machined parts, thus reducing initial cost as well as maintenance expense.

Generally stated, in presently preferred form, the apparatus includes an elongate streamlined shroud and a central body located substantially coaxially within at least the aft portion of the shroud. In the case of a conventional jet engine, the shroud may be the engine casing itself surrounding the engine and nozzle and defining a gas discharge passage, and the central body may be a "bullet" or center body aft of the turbine. In the case of a fan type engine, the central body is the casing around the engine and the shroud is radially spaced from the casing to form a fan air duct. Peripherally arranged outflow passage means is provided a short distance forward of the trailing edge of the shroud and extends through the inner and outer walls. The passage means may comprise several discrete passages or a single substantially continuous passage with spaced axially extending support structures connecting the aft section of the shroud to the main body.

In either type of passage means there are a plurality of peripherally adjacent sets of control doors located in the passage means when stowed and extending angularly inward and outward when deployed. Each set comprises a blocker door and a deflector door. In the preferred form the blocker door is pivotally mounted forward of its aft end of the shroud and, in deploying, the forward portion swings inward toward the central body while the aft, shorter, portion swings outward. The deflector door is pivotally connected at its aft end to the aft end of the blocker door and, in deploying, it swings outward and is also bodily displaced outward by the movement of the blocker door. An operating lever is pivotally connected at its forward end to the shroud and at its aft end to a point intermediate between the forward and aft ends of the deflector door to complete a four bar linkage in which the doors themselves serve as two of the links.

Actuating means are attached to the linkage to cause the doors to move between stowed and deployed position. These means include bell crank arms connected to the operating levers and pivot shafts which may be universally connected end to end around the circumference to cause all of the sets of doors to move in unison. Power is supplied by servo motors connected to at least some of the bell crank arms on the operating levers.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
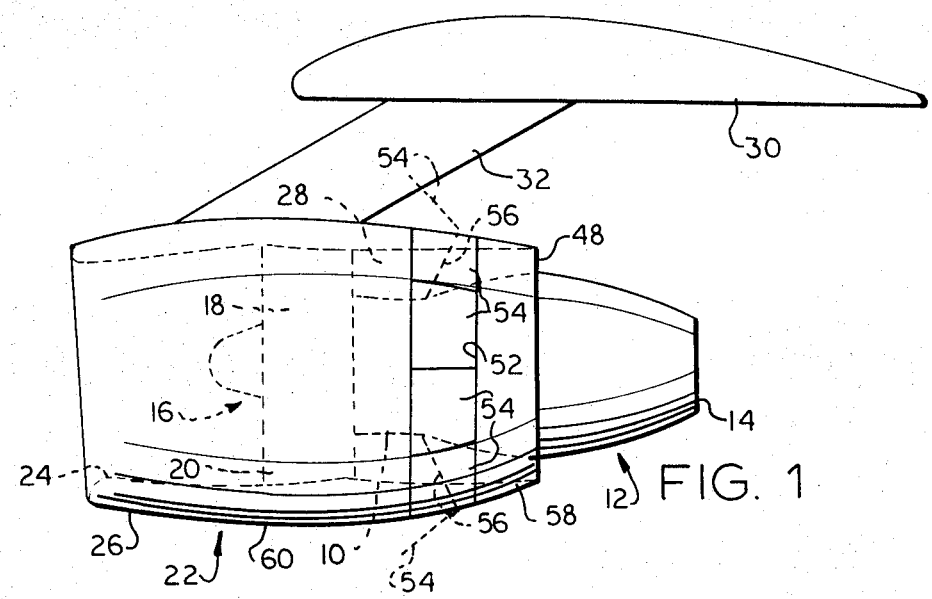
FIG. 1 is a schematic view in side elevation of a fan type engine incorporating the apparatus of this invention.

The apparatus of this invention is generally schematically illustrated in FIG. 1, in which the engine 10 is encased within a core cowl or central body 12 which terminates rearwardly at the nozzle exit 14. At its forward end, the engine is provided with an axial flow compressor or fan 16, the radially inner portion 18 of which directs combustion air into central body 12 and the radially outer portion 20 of which drives a jet or fan air stream rearward outside of the central body to directly produce jet thrust. Surrounding the fan and engine, and substantially coaxial therewith, is an elongate generally annular streamlined shroud 22 having radially spaced inner and outer walls 24 and 26. The shroud is mounted on wing 30 by means of strut 32. The inner wall 24 is radially spaced from center body 12 to form an annular duct 28 for rearward flow of the fan air stream. While a forward fan type is shown, the apparatus is applicable to an aft fan type in the same way.

Figure 2:
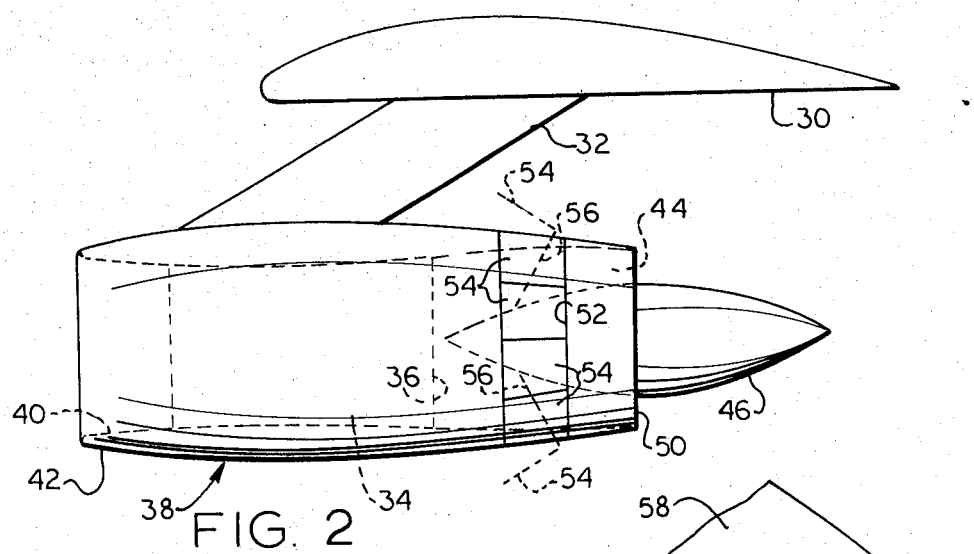
FIG. 2 is a view similar to FIG. 1 with a conventional jet engine.

FIG. 2 is a similar illustration of a conventional jet engine assembly in which engine 34, having an exhaust exit plane 36, is encased within a shroud 38 having inner and outer walls 40 and 42. The shroud extends aft of the engine proper to define an exhaust gas passage 44 to receive and control the turbine exhaust. A "bullet" or center body constitutes a central body 46 substantially coaxial with and extending into at least the aft portion of the shroud to a position aft of the turbine exit plane to define with inner wall 40 the profile of the passage 44. The shroud is mounted on wing 30 by means of strut 32.

It will be seen that in both cases a construction is provided in which a shroud surrounds a central body which is substantially coaxial with and extends into at least the aft portion of the shroud to define between them a generally annular duct for the rearward flow of a propulsion gas stream. Thus, the invention may be applied to either form of engine in exactly the same way. Each shroud is provided forward of its trailing edge 48 or 50 with peripherally arranged outflow passage means 52 extending through the inner and outer walls, and each passage means is provided with sets of control doors, the outer ones being deflector doors 54 and the inner ones being blocker doors 56. As indicated schematically in FIGS. 1 and 2, when the doors are stowed they block the passage means 52 but do not obstruct ducts 28 or 44. When they are deployed to the broken line positions, doors 56 form rearwardly divergent frusto-cones to block rearward flow through the ducts and divert the gases outward, and doors 54 form forwardly divergent frusto-cones to give the outflow a forward component and produce reverse thrust.

Figure 3:
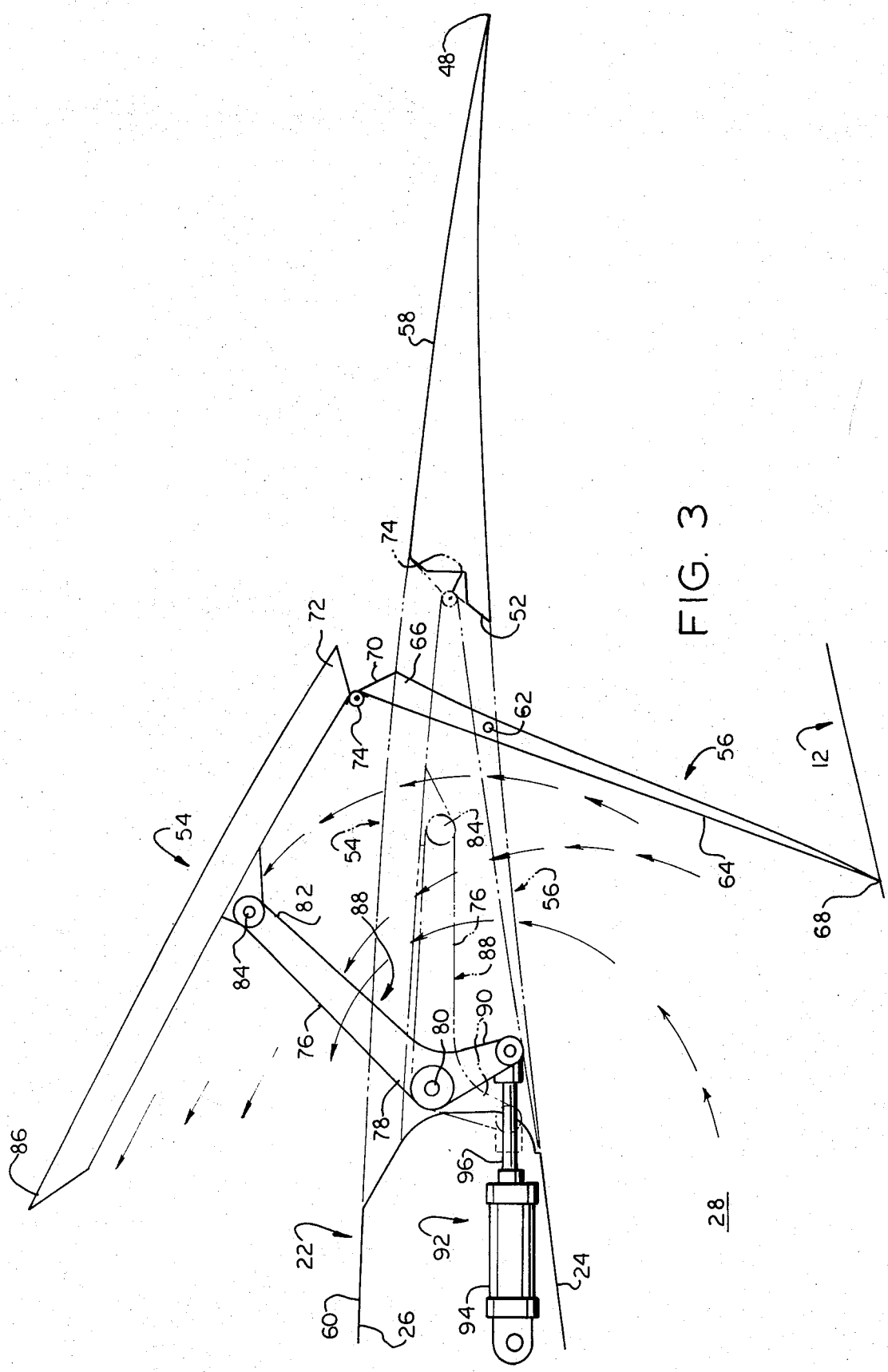
FIG. 3 is a schematic sectional view in elevation showing the arrangement of the principal components of the apparatus.

The detailed construction of the apparatus is illustrated in FIG. 3 on an enlarged scale using the reference characters of FIG. 1, although it is to be noted that it applies in the same way to FIG. 2.

As previously mentioned, passage means 52 may be a substantially uninterrupted passage extending through walls 24 and 26 with a minimum amount of support structure extending between aft portion 58 and main body 60 or it amy comprise a series of peripherally spaced discrete passages with shroud structure extending between them and defining skin portions of inner and outer walls 24 and 26. In either case a plurality of sets of control doors are arranged in lateral adjacency around the periphery of the shroud in the passage means, each set comprising a blocker door 56 and a deflector door 54.

Blocker door 56 is pivotally mounted to the shroud on a transverse axis at point 62, the major portion 64 being forward of the pivot and the minor portion 66 being aft of the pivot. When the door is deployed from its broken line position flush with the inner wall of the shroud to its solid line position the leading edge 68 contacts the central body and the trailing edge 70 swings out beyond the contour of the shroud, and the assemblage of all of the blocker doors forms a rearwardly divergent frusto-cone which diverts the propulsion gas stream smoothly and gradually outward to the passage means which has been opened by the deployment of the doors.

Deflector door 54 is pivotally connected at its aft end or trailing edge 72 to the trailing edge 70 of door 56 by pivot pin 74 having a transverse axis. An operating lever 76 is pivotally connected at its forward end 78 to the shroud adjacent to the forward margin of the passage means by a pivot pin 80 having a transverse axis, and its aft end 82 is pivotally connected to door 54 by pivot pin 84 at a selected point intermediate between leading edge 86 and trailing edge 72 of the door. This completes a four bar linkage consisting of stationary shroud structure, the operating lever, and the aft portions of the two doors.

Operating lever 76 is actually the first arm of a bell crank 88 which has a second arm 90 extending at an angle to the first arm. The actuating means for the doors comprises arm 90 and pivot pin 80, which may be an elongate shaft universally connected at its ends to similar pivot shafts for the adjacent sets of doors, and all of the pivot shafts around the periphery may be joined in the same way to cause them to rotate in unison. A servo motor 92 has a cylinder 94 connected to the shroud structure, piston not shown, and a piston rod 96 pivotally connected to the free end of arm 90 to move the latter and operating lever 76 between stowed and deployed positions. If pivot shafts 80 are used to synchronize movement they are fixedly connected to the bell cranks.

It will be seen that the servo motor actuates the four bar linkage. When operating lever 76 swings to deployed position it swings door 54 outward, pulling door 56 inward. Since door 54 is pivotally carried by the trailing edge of door 56, it is also bodily displaced outward to the position shown in solid lines. The assemblage of all of the doors 54 swinging outward forms a forwardly divergent frusto-cone which further deflects the exiting jet stream and gives it a forward component to produce reverse thrust.

The arrangement illustrated in FIG. 3 may be readily modified by a simple reversal in which door 54 would be pivotally mounted on the shroud and door 56 would be displacably carried by door 54. The actuating mechanism would, of course, also be reversed with operating arm 76 connected to door 56. However, the arrangement shown is preferred because it is desirable to shift the deflector door assemblage as far out as possible and attain a more complete reversal of the flow path.

There are substantial areas of each door of a set aft of their supporting hinge points, and the closing pressure of the gas outflow on these areas largely balances the opening pressure on the areas of the forward portions so that relatively low operating forces are required. To achieve a close balance, the respective areas may be tailored within the limits of the primary functions of the doors.

A servo motor and separate actuating linkage may be provided for each set of doors or for a pair or group of sets, or all of the pivot shafts 80 may be connected end to end around the periphery as previously mentioned, with an adequate number of servo motors connected to selected bell cranks.

Figure 4:
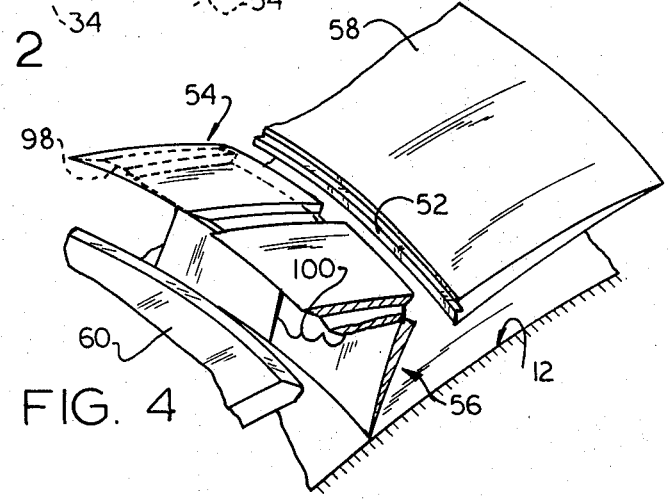
FIG. 4 is a fragmentary schematic view in perspective of certain details.

When passage means 52 is formed as a substantially continuous passage with doors 54 and 56 immediately adjacent to each other, the fore and aft margins of peripherally adjacent doors separate as the doors deploy. Since the resulting open gaps would reduce the effectiveness of the apparatus, the doors are provided with slidably overlapping portions which maintain a substantial seal between the doors at all times. As shown in FIG. 4, each door 54 is provided with step-cut side marginal portions 98 and 100 arranged in overlying relation, each portion having a sufficient peripheral extent to preserve the seal when the doors are fully deployed. Doors 56 are provided with similar step-cut side marginal portions because these doors also separate and approach each other during operation.

It will be apparent that the invention described above provides apparatus which performs the desired thrust reversing function very effectively and with a minimum number of components arranted to require relatively low operating power, the construction being simple and rugged for low first cost and maintenance expense.

I claim:

1. Thrust reversing apparatus for use in combination with a jet engine producing a rearwardly directed propulsion gas stream, comprising: an elongated streamlined shroud having inner and outer walls spaced from each other and a central body located substantially coaxially within at least the aft portion of the shroud; the inner wall of the shroud being radially spaced outward from the central body to define therewith a generally annular duct for rearward flow of the propulsion gas stream; peripherally arranged outflow passage means extending through the inner and outer walls of the shroud forward of its trailing edge for lateral outward flow of the propulsion gas stream during reverse thrust operation; and a plurality of sets of flow control doors arranged in lateral adjacency around the periphery of the shroud in the passage means; each set including a blocker door and a deflector door; a first door of each set being pivotally mounted on the shroud at a point forward of the aft end of the door on a transverse pivotal axis to swing between stowed position closing a portion of the passage means at a first wall of the shroud and deployed position with its forward portion extending forward of the pivot at a substantial angle to the longitudinal axis of the shroud and with its aft portion extending aft of the pivot at a substantial opposite angle to the longitudinal axis of the shroud; a second door of each set being pivotally connected at its aft end to the aft end of the first door of the set on a transverse pivotal axis to swing between stowed position closing a portion of the passage means at the second wall of the shroud and deployed position laterally displaced and extending forward at a substantial angle to the longitudinal axis of the shroud and opposite to the angular displacement of the forward portion of the first door; and operating lever pivotally connected at its first end to the shroud and pivotally connected at its second end to a point intermediate the forward and aft ends of the second door to complete a four bar linkage consisting of the shroud structure, the operating lever, and the aft portions of the two doors of the set; and actuator means connected to the linkage to move the doors between stowed and deployed positions; the actuator means for all of the sets being operable in unison to move all of the blocker doors to deployed position contacting the central body and defining a rearwardly divergent frusto-cone to divert the propulsion gas stream smoothly and gradually outward to the passage means, and to move all of the deflector doors to deployed position defining a forwardly divergent frusto-cone to further deflect the exiting stream outward with a forward flow component to produce a reverse thrust said first door of each set being a blocker door, and the second door of each set being a deflector door.

2. Apparatus as claimed in claim 1; the first end of the operating lever being forward of its second end and being pivotally connected to the shroud adjacent to the forward margin of the passage means.

3. Apparatus as claimed in claim 1; the actuating means being connected to the operating levers of the several sets of control doors.

4. Apparatus as claimed in claim 3; including a plurality of circumferentially spaced bell cranks having first and second arms extending at an angle to each other away from a common pivot; the first arm of each bell crank being the operating lever of one of the four bar linkages; and a servo motor mounted on the shroud and operatively connected to the second arm of each bell crank.

5. Apparatus as claimed in claim 1; in which the shroud is a casing surrounding the engine and nozzle and defining a rearwardly discharging turbine gas passage; and the central body is a gas deflecting center body located aft of the turbine exit plane to cooperate with the shroud in defining the profile of the discharge duct.

* * * * *